United States Patent [19]
Schulz

[11] 3,960,601
[45] June 1, 1976

[54] FUEL CELL ELECTRODE

[75] Inventor: David Arthur Schulz, Fairview Park, Ohio

[73] Assignee: Union Carbide Corporation, New York, N.Y.

[22] Filed: Sept. 27, 1974

[21] Appl. No.: 509,970

[52] U.S. Cl............................ 136/120 FC; 136/122
[51] Int. Cl.$^2$...................... H01M 4/06; H01M 4/08
[58] Field of Search............ 136/120 FC, 121, 86 D, 136/122

[56] References Cited
UNITED STATES PATENTS

| | | | |
|---|---|---|---|
| 3,635,763 | 1/1972 | Niedrash et al.................... | 136/86 D |
| 3,829,327 | 8/1974 | Omori et al......................... | 136/121 |

Primary Examiner—John H. Mack
Assistant Examiner—H. A. Feeley
Attorney, Agent, or Firm—John S. Piscitello

[57] ABSTRACT

Improved fuel cell electrodes produced by spinning a carbonaceous pitch having a mesophase content of from about 40 per cent by weight to about 90 per cent by weight to form carbonaceous pitch fiber; disposing staple lengths of the spun fiber in intimately contacting relationship with each other in a non-woven fibrous web; heating the web produced in this manner in an oxidizing atmosphere to thermoset the fibers to an extent which will allow the fibers to maintain their shape upon heating to more elevated temperatures; heating the web containing the thermoset fibers to a carbonizing temperature in an oxygen-free atmosphere so as to expel hydrogen and other volatiles; impregnating the web with a hydrophobic resin dispersion; compressing the impregnated web to remove excess fluid and form a thin, paper-like sheet; drying the compressed sheet, and heating it at a temperature sufficiently elevated to cause the hydrophobic resin impregnant to fuse and bond the fibers of the web together so as to increase the structural integrity and hydrophobicity of the web; and then treating the web with a metallic catalyst to produce the desired electrode.

28 Claims, No Drawings

FUEL CELL ELECTRODE

BACKGROUND OF THE INVENTION

1. Field of the Invention

This invention relates to highly conductive, structurally coherent webs of non-woven carbon fibers which are particularly adapted for use in producing improved fuel cell electrodes.

2. Description of the Prior Art

Thin, porous, electrically conductive webs of non-woven carbon fibers useful as substrates in electrodes employed in fuel cells and in other harsh environments where thermal stability and chemical inertness is required are known in the art. Before such webs can be used for such purpose, however, it is necessary that the fibers of the web be bonded together in an integral structurally coherent mass by impregnating the web with a carbonizable resin, e.g., a phenolic resin, and then heating the impregnated web to a carbonizing temperature in order to convert the resin to carbon. Furthermore, in order to further improve the electrical conductivity of the web, it is necessary to coat the impregnated web with pyrolytic carbon. The requirement of a binder and the application of a pyrolytic carbon coating, however, and the processing difficulties attendant the treatment of these webs in this manner, renders their use commercially unattractive.

SUMMARY OF THE INVENTION

In accordance with the present invention, it has now been discovered that highly conductive webs of non-woven carbon fibers which are particularly adapted for use in producing improved electrodes employed in fuel cells for the generation of electrical energy can be produced by spinning a carbonaceous pitch having a mesophase content of from about 40 percent be weight to about 90 percent by weight to form carbonaceous pitch fiber, disposing staple lengths of the spun fiber in intimately contacting relationship with each other in a non-woven fibrous web, heating the web produced in this manner in an oxidizing atmosphere to thermoset the fibers to an extent which will allow the fibers to maintain their shape upon heating to more elevated temperatures, and further heating the web containing the thermoset fibers to a carbonizing temperature in an oxygen-free atmosphere so as to expel hydrogen and other volatiles.

In addition to their high porosity and high conductance, the webs produced in this manner are particularly suitable for fuel cell applications because of their thermal stability and chemical inertness. Because these webs are very highly conductive, it is not necessary for them to be bonded with a carbonized resin and coated with pyrolytic carbon to prepare them for use, as was the case with earlier webs of non-woven carbon fibers.

Fuel cell electrodes of high conductivity are produced from the non-woven fibrous webs of the present invention by impregnating the web with a suspension of a hydrophobic resin in a suitable dispersing agent, such as water; compressing the impregnated web to remove excess fluid and form a thin, paper-like sheet; drying the compressed sheet, and heating it at a temperature sufficiently elevated to cause the hydrophobic resin impregnant to fuse and bond the fibers of the web together so as to increase the structural integrity and hydrophobicity of the web; and then treating the web with a metallic catalyst to produce the desired electrode.

Because of their inertness to both acids and bases, and their resistance to oxidation and reduction, the highly conductive electrodes produced in this manner are suitable for use both as anodes and cathodes in fuel cells operating with either acid electrolytes or alkaline electrolytes, as well as in other types of electrolytic cells. In addition, the high porosity of such electrodes permits the gaseous fuels employed in such cells to readily diffuse through the electrode and contact the electrolyte at the reactive electrode surface.

DESCRIPTION OF THE PREFERRED EMBODIMENTS

While carbonaceous fibers can be spun from non-mesophase pitches, only mesophase pitches are employed in the present invention because of their ability to produce highly-oriented fibers which can be easily thermoset. Mesophase pitches are pitches which have been transformed, in whole or in part, to a liquid crystal or so-called "mesophase" state. Such pitches by nature contain highly oriented molecules, and when these pitches are spun into fibers, the pitch molecules are preferentially aligned by the spinning process along the longitudinal axis of the fiber to produce a highly oriented fiber.

Mesophase pitches can be produced in accordance with known techniques by heating a natural or synthetic carbonaceous pitch having an aromatic base in an inert atmosphere at a temperature of above about 350°C. for a time sufficient to produce the desired quantity of mesophase. When such a pitch is heated in this manner under quiescent conditions, either at constant temperature or with gradually increasing temperature, small insoluble liquid spheres begin to appear in the pitch which gradually increase in size as heating is continued. When examined by electron diffraction and polarized light techniques, these spheres are shown to consist of layers of oriented molecules aligned in the same direction. As these spheres continue to grow in size as heating is continued, they come in contact with one another and gradually coalesce with each other to produce larger masses of aligned layers. As coalescence continues, domains of aligned molecules much larger than those of the original spheres are formed. These domains come together to form a bulk mesophase wherein the transition from one oriented domain to another sometimes occurs smoothly and continuously through gradually curving lamellae and sometimes through more sharply curving lamellae. The differences in orientation between the domains create a complex array of polarized light extinction contours in the bulk mesophase corresponding to various types of linear discontinuity in molecular alignment. The ultimate size of the oriented domains produced is dependent upon the viscosity, and the rate of increase of the viscosity, of the mesophase from which they are formed, which, in turn are dependent upon the particular pitch and the heating rate. In certain pitches, domains having sizes in excess of 200 microns and as large as several thousand microns are produced. In other pitches, the viscosity of the mesophase is such that only limited coalescence and structural rearrangement of layers occur, so that the ultimate domain size does not exceed one hundred microns.

The highly oriented, optically anisotropic, insoluble material produced by treating pitches in this manner has been given the term mesophase, and pitches containing such material are known as "mesophase piches". Such pitches, when heated above their softening points, are mixtures of two immiscible liquids, one the optically anisotropic, oriented mesophase portion, and the other the isotropic non-mesophase portion. The term mesophase is derived from the Greek "mesos" or "intermediate" and indicates the pseudo-crystalline nature of this highly-oriented, optically anisotropic material.

Carbonaceous pitches having a mesophase content of from about 40 percent by weight to about 90 percent by weight are suitable for producing the highly oriented carbonaceous fibers from which the webs employed in the present invention can be produced. In order to obtain the desired fibers from such pitch, however, the mesophase contained therein must, under quiescent conditions, form a homogeneous bulk mesophase having large coalesced domains, i.e., domains of aligned molecules in excess of 200 microns. Pitches which form stringy bulk mesophase under quiescent conditions, having small oriented domains, rather than large coalesced domains, are unsuitable. Such pitches form mesophase having a high viscosity which undergoes only limited coalescence, insufficient to produce large coalesced domains having sizes in excess of 200 microns. Instead, small oriented domains of mesophase agglomerate to produce clumps or stringy masses wherein the ultimate domain size does not exceed 100 microns. Certain pitches which polymerize very rapidly are of this type. Likewise, pitches which do not form a homogeneous bulk mesophase are unsuitable. The latter phenomenon is caused by the presence of infusible solids (which are either present in the original pitch or which develop on heating) which are enveloped by the coalescing mesophase and serve to interrupt the homogeneity and uniformity of the coalesced domains, and the boundaries between them.

Another requirement is that the pitch be nonthixotropic under the conditions employed in the spinning of the pitch into fibers, i.e., it must exhibit a Newtonian or plastic flow behavior so that the flow is uniform and well behaved. When such pitches are heated to a temperature where they exhibit a viscosity of from about 10 poises to about 200 poises, uniform fibers may be readily spun therefrom. Pitches, on the other hand, which do not exhibit Newtonian or plastic flow behavior at the temperature of spinning, do not permit uniform fibers to be spun therefrom.

Carbonaceous pitches having a mesophase content of from about 40 percent by weight to about 90 percent by weight can be produced in accordance with known techniques, as aforesaid, by heating a natural or synthetic carbonaceous pitch having an aromatic base in an inert atmosphere at a temperature above about 350°C. for a time sufficient to produce the desired quantity of mesophase. By an inert atmosphere is meant an atmosphere which does not react with the pitch under the heating conditions employed, such as nitrogen, argon, xenon, helium, and the like. The heating period required to produce the desired mesophase content varies with the particular pitch and temperature employed, with longer heating periods required at lower temperatures than at higher temperatures. At 350°C., the minimum temperature generally required to produce mesophase, at least 1 week of heating is usually necessary to produce a mesophase content of about 40 percent. At temperatures of from about 400° to 450°C., conversion to mesophase proceeds more rapidly, and a 50 percent mesophase content can usually be produced at such temperatures within about 1–40 hours. Such temperatures are preferred for this reason. Temperatures above above 500°C. are undesirable, and heating at this temperature should not be employed for more than about 5 minutes to avoid conversion of the pitch to coke.

The degree to which the pitch has been converted to mesophase can readily be determined by polarized light microscopy and solubility examinations. Except for certain non-mesophase insolubles present in the original pitch or which, in some instances, develop on heating, the non-mesophase portion of the pitch is readily soluble in organic solvents such as quinoline and pyridine, while the mesophase portion is essentially insoluble. [1] In the case of pitches which do not develop non-mesophase insolubles when heated, the insoluble content of the heat treated pitch over and above the insoluble content of the pitch before it has been heat treated corresponds essentially to the mesophase content. [2] In the case of pitches which do develop non-mesophase insolubles when heated, the insoluble content of the heat treated pitch over and above the insoluble content of the pitch before it has been heat treated is not solely due to the conversion of the pitch to mesophase, but also represents non-mesophase insolubles which are produced along with the mesophase during the heat treatment. Pitches which contain infusible non-mesophase insolubles (either present in the original pitch or developed by heating) in amounts sufficient to prevent the development of homogeneous bulk mesophase are unsuitable for producing highly oriented carbonaceous fibers useful in the present invention, as noted above. Generally, pitches which contain in excess of about 2 percent by weight of such infusible materials are unsuitable. The presence or absence of such homogeneous bulk mesophase regions, as well as the presence or absence of infusible non-mesophase insolubles, can be visually observed by polarized light microscopy examination of the pitch (see, e.g., Brooks, J. D., and Taylor, G. H., "The Formation of Some Graphitizing Carbons," *Chemistry and Physics of Carbon*, Vol. 4, Marcel Dekker, Inc., New York, 1968, pp. 243–268; and Dubois, J., Agache, C., and White, J. L., "The Carbonaceous Mesophase Formed in the Pyrolysis of Graphitizable Organic Materials," Metallography 3, pp. 337–369, 1970). The amounts of each of these materials may also be visually estimated in this manner.

[1] The percent of quinoline insolubles (Q.I.) of a given pitch is determined by quinoline extraction at 75°C. The percent of pyridine insolubles (P.I.) is determined by Soxhlet extraction in boiling pyridine (115°C.).

[2] The insoluble content of the untreated pitch is generally less than 1 percent (except for certain coal tar pitches) and consists largely of coke and carbon black found in the original pitch.

Aromatic base carbonaceous pitches having a carbon content of from about 92 percent by weight to about 96 percent by weight and a hydrogen content of from about 4 percent by weight to about 8 percent by weight are generally suitable for producing mesophase pitches which can be employed to produce the fibers useful in the instant invention. Elements other than carbon and hydrogen, such as oxygen, sulfur and nitrogen, are undesirable and should not be present in excess of about 4 percent by weight. When such extraneous elements are present in amounts of from about 0.5 percent by weight to about 4 percent by weight, the pitches generally have a carbon content of from about 92–95 percent by weight, the balance being hydrogen.

Petroleum pitch, coal tar pitch and acenaphthylene pitch are preferred starting materials for producing the mesophase pitches which are employed to produce the fibers useful in the instant invention. Petroleum pitch can be derived from the thermal or catalytic cracking of petroleum fractions. Coal tar pitch is similarly obtained by the destructive distillation of coal. Both of these materials are commercially available natural pitches in which mesophase can easily be produced, and are preferred for this reason. Acenaphthylene pitch, on the other hand, is a synthetic pitch which is preferred because of its ability to produce excellent fibers. Acenaphthylene pitch can be produced by the pyrolysis of polymers of acenaphthylene as described by Edstrom et al. in U.S. Pat. No. 3,574,653.

Some pitches, such as fluoranthene pitch, polymerize very rapidly when heated and fail to develop large coalesced domains of mesophase, and are, therefore, not suitable precursor materials. Likewise, pitches having a high infusible non-mesophase insoluble content in organic solvents such as quinoline or pyridine, or those which develop a high infusible non-mesophase insoluble content when heated, should not be employed as starting materials, as explained above, because these pitches are incapable of developing the homogeneous bulk mesophase necessary to produce highly oriented carbonaceous fibers. For this reason, pitches having an infusible quinoline-insoluble or pyridine-insoluble content of more than about 2 percent by weight (determined as described above) should not be employed, or should be filtered to remove this material before being heated to produce mesophase. Preferably, such pitches are filtered when they contain more than about 1 percent by weight of such infusible, insoluble material. Most petroleum pitches and synthetic pitches have a low infusible, insoluble content and can be used directly without such filtration. Most coal tar pitches, on the other hand, have a high infusible, insoluble content and required filtration before they can be employed.

As the pitch is heated at a temperature between 350° and 500°C. to produce mesophase, the pitch will, of course, pyrolyze to a certain extent and the composition of the pitch will be altered, depending upon the temperature, the heating time, and the composition and structure of the starting material. Generally, however, after heating a carbonaceous pitch for a time sufficient to produce a mesophase content of from about 40 percent by weight to about 90 percent by weight, the resulting pitch will contain a carbon content of from about 94–96 percent by weight and a hydrogen content of from about 4–6 percent by weight. When such pitches contain elements other than carbon and hydrogen in amounts of from about 0.5 percent by weight to about 4 percent by weight, the mesophase pitch will generally have a carbon content of from about 92–95 per cent by weight, the balance being hydrogen.

After the desired mesophase pitch has been prepared, it is spun into fiber by conventional techniques, e.g., by melt spinning, centrifugal spinning, blow spinning, or in any other known manner. As noted above, in order to obtain highly oriented carbonaceous fibers from which the webs employed in the present invention can be produced the pitch must, under quiescent conditions, form a homogeneous bulk mesophase having large coalesced domains, and be nonthixotropic under the conditions employed in the spinning. Further, in order to obtain uniform fibers from such pitch, the pitch should be agitated immediately prior to spinning so as to effectively intermix the immiscible mesophase and non-mesophase portions of the pitch.

The temperature at which the pitch is spun depends, of course, upon the temperature at which the pitch exhibits a suitable viscosity, and at which the higher-melting mesophase portion of the pitch can be easily deformed and oriented. Since the softening temperature of the pitch, and its viscosity at a given temperature, increases as the mesophase content of the pitch increases, the mesophase content should not be permitted to rise to a point which raises the softening point of the pitch to excessive levels. For this reason, pitches having a mesophase content of more than about 90 percent are generally not employed. Pitches containing a mesophase content of from about 40 percent by weight to about 90 percent be weight, however, generally exhibit a viscosity of from about 10 poises to about 200 poises at temperatures of from about 310°C. to above about 450°C. and can be readily spun at such temperatures. Preferably, the pitch employed has a mesophase content of from about 45 percent by weight to about 75 percent by weight, most preferably from about 55 percent by weight to about 75 percent by weight, and exhibits a viscosity of from about 30 poises to about 150 poises at temperatures of from about 340°C. to about 440°C. At such viscosity and temperature, uniform fibers having diameters of from about 10 microns to about 20 microns can be easily spun. As previously mentioned, however, in order to obtain the desired fibers, it is important that the pitch be nonthixotropic and exhibit Newtonian or plastic flow behavior during the spinning of the fibers.

The carbonaceous fibers produced in this manner are highly oriented materials having a high degree of preferred orientation of their molecules parallel to the fiber axis, as shown by their X-ray diffraction patterns. This preferred orientation is apparent from the short arcs which constitute the (002) bands of the diffraction pattern. Microdensitometer scanning of the (002) bands of the exposed X-ray film indicate this preferred orientation to be generally from about 20° to about 35°, usually from about 25° to about 30° (expressed as the full width at half maximum of the azimuthal intensity distribution).

After the fiber has been spun, staple lengths of the fiber are formed into a non-woven web wherein the staple fiber lengths are disposed in intimately contacting relationship with each other. Preferably the staple fiber lengths are produced by blow-spinning of the pitch, and the blow-spun fibers are disposed into a web directly from the spinnerette. This can be conveniently accomplished by positioning a screen in the vicinity of the spinnerette and reducing the pressure behind the screen so as to draw the blow-spun fibers onto the screen. The fibers are preferably deposited on the screen so as to produce a web having an areal density of about 0.05–0.5 kg./m.$^2$ of screen surface. The screen employed is preferably in the form of an endless wire mesh conveyor belt which can be used to transport the web through an oxidizing atmosphere.

Alternatively, continous fiber can be spun and then cut or chopped into a desired length before being processed to form a web. Any method, either wet or dry, which effects the disposition of such fibers in intimately contacting relation in a non-woven fibrous web can be employed. Air laying operations, such as carding or garnetting, which effect a relatively oriented disposition of fibers are suitable for this purpose. When a more random disposition of fibers is desired, conventional textile devices which effect the air laying of fibers in a random webbing can be employed.

The fibers can also be formed into a web by water laying the fibers using conventional paper making techniques. When such techniques are employed, the fibers are first cut to a length suitable for processing, e.g., about one-fourth inch in length, homogeneously intermixed with water and a suitable binder, such as starch or other well known binder, to form an aqueous slurry, and then deposited from the slurry on a substrate to form a web. Generally, the web is formed either by running a dilute suspension of fibers onto the surface of a moving endless belt of wire cloth, through which excess water may be drawn, or by running an endless belt of wire cloth through a suspension of the fibers. In the first case, a part of the water is drawn off by gravity, a part is taken from the web by suction, and a part is removed by pressure. In the second case, a vacuum is maintained below the stock level in the cylinder in which the wire cloth is rotating and the web forms on the wire by suction. In either case, the thickness of the web is controlled by the speed of the conveyor belt, by the consistency of the fiber suspension, and by the amount of suspension permitted to flow onto the belt.

After the non-woven fibrous web has been formed, it is heated in an oxidizing atmosphere for a time sufficient to thermoset the fibers of the web to an extent which will allow the fibers to maintain their shape upon heating to more elevated temperatures. As noted above, the non-woven fibrous web is preferably produced by blow-spinning staple lengths of fiber and collecting the blow-spun fibers on an endless wire mesh conveyor belt which can be used to transport the web through an oxidizing atmosphere. By varying the speed of this belt it is possible to expose the web to the oxidizing atmosphere for any desired length of time and thereby thermoset the fibers contained therein to any desired degree. If desired, an oxidizing oven containing a number of zones having progressively higher temperatures can be employed so as to allow the fibers to be gradually heated to the desired final oxidizing temperature. Because the oxidation reaction is an exothermic one, and hence difficult to control, the oven is suitably a convection oven in which the oxidizing atmosphere may be passed through the web and wire mesh conveyor belt so as to remove heat of reaction from the immediate vicinity of the fibers and maintain a more constant temperature. The oxidizing gas, of course, may be recirculated through the oven after passing through the web and conveyor belt. To help maintain the web securely against the belt and prevent the fibers from blowing around in the oven, the oxidizing gas should be circulated downward through the web and belt rather than upward. The rate of flow of the gas, as well as the temperature, should be independently controlled in each zone of the oven to allow temperature and gas flow through the web to be regulated as desired. Gas velocity through the web is suitably maintained at a rate of from about 0.3 to about 60 meters per minute, preferably about 1 to about 3 meters per minute. The temperature of the zones is maintained, e.g., at from about 175°C. in the first or entrance zone up to about 400°C. in the last or exit zone.

The oxidizing atmosphere employed to thermoset the fibers of the non-woven webs of the present invention may be pure oxygen, nitric oxide, or any other appropriate oxidizing atmosphere. Most conveniently, air is employed as the oxidizing atmosphere.

The time required to thermoset the fibers will, of course, vary with such factors as the particular oxidizing atmosphere, the temperature employed, the diameter of the fibers, the particular pitch from which the fibers are prepared, and the mesophase content of such pitch. Generally, however, thermosetting can be effected in relatively short periods of time, usually in from about 5 minutes to about 60 minutes.

The temperature employed to effect thermosetting of the fibers must, of course, not exceed the temperature at which the fibers will soften or distort. The maximum temperature which can be employed will thus depend upon the particular pitch from which the fibers were spun, and the mesophase content of such pitch. The higher the mesophase content of the fiber, the higher will be its softening temperature, and the higher the temperature which can be employed to effect thermosetting. At higher temperatures, of course, thermosetting can be effected in less time than is possible at lower temperatures. Fibers having a lower mesophase content, on the other hand, require relatively longer heat treatment at somewhat lower temperatures to render them infusible.

A minimum temperature of at least 250°C. is generally necessary to effectively thermoset the fibers. Temperatures in excess of 500°C. may cause melting and/or excessive burn-off of the fibers and should be avoided. Preferably, temperatures of from about 275°C. to about 390°C. are employed. At such temperatures, the required amount of thermosetting can usually be effected within from about 5 minutes to about 60 minutes.

After the fibers have been thermoset as required, they are heated to a carbonizing temperature so as to expel hydrogen and other volatiles. At a temperature of about 1000°C., fibers having a carbon content greater than about 98 percent by weight are obtained. At temperatures in excess of 1500°C., the fibers are substantially completely carbonized. Such heating should be conducted in an oxygen-free atmosphere, such as the inert atmospheres described above, to prevent further oxidation of the fibers.

Usually, carbonization is effected at a temperature of from about 1000°C. to about 2500°C., preferably from about 1400°C. to about 1700°C. Generally, residence times of from about 0.5 minute to about 60 minutes are employed. While more extended heating times can be employed with good results, such residence times are uneconomical and, as a practical matter, there is no advantage in employing such long periods. In order to ensure that the rate of weight loss of the fibers does not become so excessive as to disrupt the fiber structure, it is preferred to gradually heat the fibers to their final carbonization temperature.

In a preferred embodiment of the invention, the thermoset web is continuously transported through a carbonizing oven on an endless carbon cloth conveyor belt, i.e., on a belt consisting of either graphitic or non-graphitic carbon. Carbon cloth is particularly suitable for use as a conveyor belt in a carbonizing oven because of its strength, flexibility, and high temperature resistance, as well as because it is soft, nonabrasive and nonreactive with the fibers of the web, and hence will not damage the web.

If desired, the carbonized web may be further heated in an inert atmosphere, as described hereinbefore, to a graphitizing temperature in a range of from above about 2500°C. to about 3300°C., preferably from about 2800°C. to about 3000°C. A residence time of about 1 minute is satisfactory, although both shorter and longer times may be employed, e.g., from about 10 seconds to about 5 minutes, or longer. Residence times longer than 5 minutes are uneconomical and unnecessary, but may be employed if desired.

If desired, self-bonded webs of carbon fibers produced in accordance with copending application Ser. No. 510,128 can be employed to produce the electrodes of the present invention. Such self-bonded webs can be produced by heating a non-woven web of pitch fibers as hereinbefore described in an oxidizing atmosphere for a time sufficient to thermoset the surfaces of the fibers of the web to an extent which will allow the fibers to maintain their shape upon heating to more elevated temperatures but insufficient to thermoset the pitch in the interior portions of the fibers to an extent which will prevent the pitch from flowing and exuding through surface pores or flows in the fibers upon such further heating, further heating the web under compressive pressure in a non-oxidizing atmosphere to a temperature sufficiently elevated to cause the mesophase pitch in the unoxidized interior portions of said fibers to undergo liquid flow and exude through surface pores or flaws in the fibers, and finally heating the web to a carbonizing temperature to expel hydrogen and other volatiles and produce a self-bonded carbon fiber web. Generally, thermosetting of the fibers to an oxygen content of from about 1 percent by weight to about 6 percent by weight is sufficient of allow the fibers to maintain their shape and at the same time not prevent the pitch in the interior portions of the fibers from flowing and exuding through surface pores or flows in the fibers upon further heating at more elevated temperatures. Upon further heating, small droplets of molten pitch exude from the fibers at intervals along the fiber lengths and contact the surfaces of the adjacent fibers. By applying pressure to the web during such heating to effect greater fiber-to-fiber contact, this bleeding to be conveniently utilized to bond the fibers together into a cohesive, self-bonded mass. Pressures of from about 0.1 kPa to about 5 kPa are generally sufficient for this purpose. When webs having an areal density of from about 0.05 kg./m.$^2$ to about 0.5 kg./m.$^2$ are thermoset to an oxygen content of from about 1 percent to about 3 percent and heated in this manner, thin, paper-like sheets are obtained which can be employed to produce the electrodes of the present invention. When the web is further heated to a carbonizing temperature so as to expel hydrogen and other volatiles and produce a carbon body, infusible carbon bonds are produced between the fibers and a self-bonded web is obtained. The web may be further heated to a graphitizing temperature if desired.

Before the carbonized or graphitized webs (whether or not self-bonded) can be employed as electrodes, they must be treated with a hydrophobic resin and a metallic catalyst. The web is impregnated with a dispersion of the resin; compressed to remove excess fluid and form a thin, paper-like sheet; dried, and heated at a temperature sufficiently elevated to cause the hydrophobic resin impregnant to fuse and bond the fibers of the web together so as to increase the structural integrity and hydrophobicity of the web. A metallic catalyst is then applied to the hydrophobic web. When self-bonded webs which have already been compressed to a thin, paper-like sheet are employed, it is not necessary that they be recompressed after impregnation with the hydrophobic resin dispersion. If desired, the web may be compressed into a thin, paper-like sheet while it is being heated to fuse the hydrophobic resin instead of before such heat treatment or, if desired, such compression may be employed to further densify the web.

The hydrophobic resin to be employed is suspended in a suitable dispersing agent, such as water, and the web is impregnated with the suspension by any suitable method, e.g., by immersing the web into the suspension for a time sufficient to absorb the desired amount of the suspension. The hydrophobic resin should be dispersed in the dispersing agent so as to form a dispersion containing about 5 percent by weight to about 70 percent by weight hydrophobic resin, and the web should be allowed to absorb a sufficient amount of the suspension to provide from about 0.05 kg. of resin per square meter of web to about 0.5 kg. of resin per square meter of web after drying. If necessary, a suitable dispersing agent may be employed to facilitate dispersion of the resin.

If desired a small amount of carbonaceous flour may be admxed with the hydrophobic resin dispersion before it is introduced into the pores of the web in order to lower the electrical resistance of the hydrophobic resin. Generally, from about 5 parts by weight to about 85 parts by weight of the carbonaceous flour per 100 parts by weight of the hydrophobic resin dispersion can be employed. Suitable carbonaceous flour includes activated carbon, graphite flour, petroleum coke flour, pitch coke flour, lampblack flour, gas black flour, furnace combustion flour, furnace thermal black flour, and the like.

After the web has been allowed to absorb the desired amount of hydrophobic resin dispersion, it is compressed to remove excess fluid and compact the web into a thin, paper-like sheet. Any suitable means of applying pressure to the web can be employed, e.g., by passing the web through a pair of compression rollers. Pressure of from about 0.1 kPa to about 5 kPa are generally suitable.

The thin, paper-like web produced in this manner is then dried, e.g., by heating to a temperature of from about 100°C. to about 200°C., and further heated to a temperature sufficiently elevated to cause the hydrophobic resin impregnant to fuse and bond the fibers of the web together so as to increase the structural integrity and hydrophobicity of the web. Heating at a temperature of from about 300°C. to about 1000°C., is usually sufficient to fuse most hydrophobic resins.

Fluorinated hydrocarbons, such as polytetrafluoroethylene, or copolymers of polytetrafluoroethylene and polyhexafluoroethylene, are particularly suitable resins for use in treating the webs employed in the present invention because of their exceptional hydrophobicity and resistance to heat and corrosive environments. Other hydrophobic resins, such as polyethylene, polypropylene, polyvinyl fluoride, polyvinyl chloride, and the like, can also be employed. Such resins may be readily dispersed in water with the use of a suitable wetting agent, e.g., an alkylaryl polyether alcohol such as Triton X-100 (manufactured by Rohm and Haas Co.). The wetting agent is suitably employed in an amount of from about 1 part by weight to about 5 parts by weight per 100 parts by weight of the combined weight of hydrophobic resin and water.

After fusion of the hydrophobic resin, the impregnated web generally contains from about 0.05 kg. to about 0.5 kg. of hydrophobic resin per square meter of web, preferably from about 0.06 kg. to about 0.12 kg. of resin per square meter of web. When a carbonaceous flour is employed with the hydrophobic resin, the impregnated web generally contains from about 0.03 kg. to about 8.5 kg. of such flour per square meter of web.

The impregnated webs produced in this manner are stiff and capable of supporting themselves. The permeability of the impregnated web is related to its thickness and decreases as the thickness is increased. In order to maintain maximum permeability consistent with a usable electrode, the thickness of the web is preferably maintained between 0.1 mm. and 1.0 mm. Impregnated webs of such thickness usually have a permeability of about 1 Darcy to about 10 Darcy.

The pore size of the web also affects its permeability. The pore size of the web can be altered by varying the diameter size of the fibers employed in its preparation. Larger pore size and higher permeability can be obtained by using larger diameter fibers. Smaller fibers provide smaller pores and lower permeability. Pore sizes of from about 30 microns to about 120 microns have been found suitable. Such pore sizes can be obtained by employing fibers having diameters of from about 5 microns to about 30 microns.

Despite the presence of the hydrophobic resin, the electrical conductance of webs produced in this manner has been found to be surprisingly high, i.e., several times higher than presently used webs prepared from conventional carbon fibers which are bonded together with a carbonized resin and impregnated with pyrolytic carbon. Illustratively, webs containing about 0.1 kg. of resin (polytetrafluoroethylene) per square meter of web have been found to have a conductance of between about 5 ohm$^{-1}$ and 20 ohm$^{-1}$ as compared to an electrical conductance of 3–4 ohm$^{-1}$ for presently used webs.

The electrochemical performance of the web is enhanced by depositing a catalytic metallic material having desired activating characteristics upon the surface and within the pore structure of the impregnated web. Such catalytically active materials are well known in the art, as are the techniques for depositing such materials on fuel cell electrodes. Among the catalytically active materials which have heretofore been employed to enhance the activity of fuel cell electrodes are the noble metals. Such metals are readily applied to the now hydrophobic web by known impregnation techniques. Typically, the hydrophobic web is impregnated with an aqueous solution of a compound containing an active noble metal, and then heated to remove water and reduce said compound so as to deposit said active metal on the web. Thus, when platinum is employed as the catalyzing agent, the metal may be added as chloroplatinic acid. When palladium is employed, the metal may be added as palladium chloride. Other compounds of these metals, and other metals, such as ruthenium, rhodium, osmium, iridium, silver, and gold may be used to impregnate the web. Subsequent reduction of these compounds leaves the pure metal deposited on the surface and within the pores of the web. Electrodes thus formed may be employed to advantage in fuel cells operating with an acid electrolyte, such as sulfuric acid, or with an alkaline electrolyte such as potassium hydroxide. The electrical conductance of such electrodes is considerably higher than the electrical conductance of like electrodes prepared from webs of conventional carbon fibers which have been bonded together with a carbonized resin and impregnated with pyrolytic carbon.

EXAMPLES

The following example is set forth for purposes of illustration so that those skilled in the art may better understand the invention. It should be understood that it is exemplary only, and should not be construed as limiting the invention in any manner.

EXAMPLE 1

A commercial petroleum pitch was employed to produce a pitch having a mesophase content of about 64 percent by weight. The precursor pitch had a density of 1.25 mg./m.$^3$, a softening temperature of 120°C. and contained 0.7 percent by weight quinoline insolubles (Q.I. was determined by quinoline extraction at 75°C.). Chemical analysis showed a carbon content of 93.8%, of hydrogen content of 4.7%, a sulfur content of 0.4% and 0.1% ash.

The mesophase pitch was produced by heating the precursor petroleum pitch at a temperature of about 400°C. for about 15 hours under a nitrogen atmosphere.

After heating, the pitch contained 64 percent by weight quinoline insolubles, indicating that the pitch had a mesophase content of close to 64 percent. A portion of this pitch was then blow-spun by means of a spinnerette at a temperature of 380°C. to produce staple lengths of fiber approximately 25 mm. in length and 10 microns in diameter. The blow-spun fibers were deposited in intimately contacting relationship with each other on a wire mesh conveyor belt positioned beside the spinnerette by reducing the pressure behind the conveyor belt so as to draw the blow-spun fibers onto the belt. The fibers were allowed to collect on the belt until a fibrous web having an areal density of 0.1–0.3 kg./m.$^2$ of belt surface accumulated.

The fibrous web produced in this manner was then transported on the conveyor belt through a 12-meter long forced-air convection oven at a speed of 1.33 meters/minute. The oven contained eight zones, each 1.5 meters in length, and the web was gradually heated from 175°C. in the first or entrance zone to 375°C. in the eighth or exit zone while air was passed downward through the web and conveyor belt at a velocity of about 2 meters/minute. The oxygen content of the fibers was increased to 8.0 percent as a result of this procedure.

The thermoset web was then transported on a graphite cloth conveyor belt through a 6-meter long carbonizing oven at a speed of 1.2 meters/minute. The oven contained five zones, each 1.2 meters in length, and the web was gradually heated in a nitrogen atmosphere from 550°C. in the first or entrance zone to 1400°C. in the eighth or exit zone.

The carbonized web was cut into 8-inch by 24-inch sections which were then dipped into a suspension of 60 weight percent polytetrafluoroethylene in water (TFE-30, manufactured by E. I. du Pont de Nemours and Company) and allowed to soak until they were saturated with the suspension. The webs were impregnated with approximately 0.2 kg. of polytetrafluoroethylene per square meter of web, on a dry basis, by this treatment.

Impregnated web sections prepared in this manner were rolled on a flat surface with a 2-inch diameter stainless steel bar to remove excess liquid and compact the web sections into thin, paper-like sheets. These sheets were dried by heating at 200°C. and then transported through a 12-meter long oven at a speed of 0.3 meters/minute where they were heated to a temperature of 500°C. so as to cause the polytetrafluoroethylene impregnant to fuse. The oven contained 8 zones, each 1.5 meters in length, and the sheets were gradually heated in a nitrogen atmosphere from 25°C. in the first or entrance zone to 500°C. in the last three zones.

An aqueous suspension of polytetrafluoroethylene (8 weight percent and activated carbon (7 weight percent) was then applied to the sheets through a 160 mesh silk screen (to remove agglomerations). Following this, the sheets were heated at 325°C. for 30 minutes in a nitrogen atmosphere. The webs were impregnated with approximately 0.01 kg. of polytetrafluoroethylene and 0.01 kg. of activated carbon per square meter of web, on a dry basis, by this treatment.

The sheets treated in this manner were then painted on one side with a platinum chloride solution prepared by admixing an aqueous solution of platinum chloride (containing 10 weight percent platinum) with an equal volume of isopropyl alcohol. The painted sheets were heated in a nitrogen atmosphere at a temperature of 150°C. for 30 minutes to dry them and to effect thermal decomposition of the platinum salt, and then submerged in a 1 percent aqueous solution of $KBH_4$ in water to ensure reduction of the platinum salt and remove any remaining chloride.

After drying, the electrode produced in this manner was installed and tested as an anode in a test cell (7.62cm by 7.62cm) employing a phosphoric acid electrolyte, hydrogen gas as fuel, and air as the oxidant. The test cell had a tantalum oxide cloth matrix separator sandwiched between the anode and the cathode with the catalyzed active side of the electrode in contact with the electrolyte-containing matrix. At a current density of 100 mA/cm.$^2$, the potential at terminals of the electrode was 0.7 volt.

When an electrode prepared in a similar manner from a commercially available carbon fiber web (Grade VDL, supplied by Union Carbide Corporation) was tested in the cell, the electrode had a potential of 0.6 volt at a current density of 100 mA/cm.$^2$

What is claimed is:

1. In a thin web of non-woven carbon fibers suitable for use as a substrate in fuel cell electrodes, the improvement wherein the web is impregnated with from 0.05 kg. to 0.5 kg. of a fused hydrophobic resin per square meter of web, which resin serves to increase the structural integrity and hydrophobicity of the web, and the web has been produced by spinning carbonaceous pitch fiber having a mesophase content of from 40 percent by weight to 90 percent by weight from a non-thixotropic carbonaceous pitch having a mesophase content of from 40 percent by weight to 90 percent by weight and which, under quiescent conditions, forms a homogeneous bulk mesophase having large coalesced domains, disposing staple lengths of the spun fiber in intimately contacting relationship with each other in a non-woven fibrous web, heating the web produced in this manner in an oxidizing atmosphere to thermoset the fibers to an extent which will allow the fibers to maintain their shape upon heating to more elevated tepmperatures, and further heating the web containing the thermoset fibers to a carbonizing temperature in an oxygen-free atmosphere so as to expel hydrogen and other volatiles.

2. A substrate as in claim 1 coated with a catalytically active metal to form an electrode.

3. An electrode as in claim 2 wherein the catalytically active metal is a noble metal.

4. An electrode as in claim 3 wherein the noble metal is platinum.

5. A substrate as in claim 1 wherein the hydrophobic resin is impregnated with a carbonaceous flour.

6. A substrate as in claim 5 coated with a catalytically active metal to form an electrode.

7. An electrode as in claim 6 wherein the catalytically active metal is a noble metal.

8. An alectrode as in claim 7 wherein the noble metal is platinum.

9. A substrate as in claim 5 wherein the carbonaceous flour is activated carbon.

10. A substrate as in claim 9 coated with a catalytically active metal to form an electrode.

11. An electrode as in claim 10 wherein the catalytically active metal is a noble metal.

12. An electrode as in claim 11 wherein the noble metal is platinum.

13. A substrate as in claim 1 wherein the hydrophobic resin is polytetrafluoroethylene.

14. A substrate as in claim 13 coated with a catalytically active metal to form an electrode.

15. An electrode as in claim 14 wherein the catalytically active metal is a noble metal.

16. An electrode as in claim 15 wherein the noble metal is platinum.

17. A substrate as in claim 13 which contains from 0.06 kg. to 0.12 kg. of polytetrafluoroethylene per square meter of web.

18. A substrate as in claim 17 coated with a catalytically active metal to form an electrode.

19. An electrode as in claim 18 wherein the catalytically active metal is a noble metal.

20. An electrode as in claim 19 wherein the noble metal is platinum.

21. A substrate as in claim 13 wherein the polytetrafluoroethylene resin is impregnated with a carbonaceous flour.

22. A substrate as in claim 21 coated with a catalytically active metal to form an electrode.

23. An electrode as in claim 22 wherein the catalytically active metal is a noble metal.

24. An electrode as in claim 23 wherein the noble metal is platinum.

25. A substrate as in claim 21 wherein the carbonaceous flour is activated carbon.

26. A substrate as in claim 25 coated with a catalytically active metal to form an electrode.

27. An electrode as in claim 26 wherein the catalytically active metal is a noble metal.

28. An electrode as in claim 27 wherein the noble metal is platinum.

* * * * *

UNITED STATES PATENT OFFICE
CERTIFICATE OF CORRECTION

Patent No. 3,960,601    Dated June 1, 1976

Inventor(s) David Arthur Schulz

It is certified that error appears in the above-identified patent and that said Letters Patent are hereby corrected as shown below:

Summary sheet, "Niedrash et al " should read -- Niedrach et al --.

Column 1, line 38, "be" should read -- by --.

Column 3, line 1, quotation marks should appear about the word "mesophase".

Column 3, line 3, "piches'" should read -- pitches --.

Column 3, line 7, quotation marks should appear about the word "mesophase".

Column 3, line 68, "400°" should read -- 400°C. --.

Column 4, line 5, "above above" should read -- above about --.

Column 5, line 39, "required" should read -- require --.

Column 5, line 40, "350°" should read -- 350°C. --

Column 6, line 17, "be" should read -- by --.

UNITED STATES PATENT OFFICE
CERTIFICATE OF CORRECTION

Patent No. 3,960,601      Dated June 1, 1976

Inventor(s) David Arthur Schulz

It is certified that error appears in the above-identified patent and that said Letters Patent are hereby corrected as shown below:

Column 9, line 32, "of" should read -- to --.

Column 9, line 35, "flows" should read -- flaws --.

Column 10, line 24, "admxed" should read -- admixed --.

Column 12, line 17, "mg./m.$^3$" should read Mg./m.$^3$ --.

Column 12, line 21, "of" first occurrence should be -- a --

Column 13, line 14, "percent" should read -- percent) --.

Column 14, line 20, "alectrode" should read -- electrode --.

Signed and Sealed this

Fourth Day of July 1978

[SEAL]

Attest:

RUTH C. MASON
Attesting Officer

DONALD W. BANNER
Commissioner of Patents and Trademarks